March 1, 1932.  S. L. VAN METER, JR  1,848,035
BATTERY REFILLING DEVICE
Original Filed March 6, 1926  2 Sheets-Sheet 1
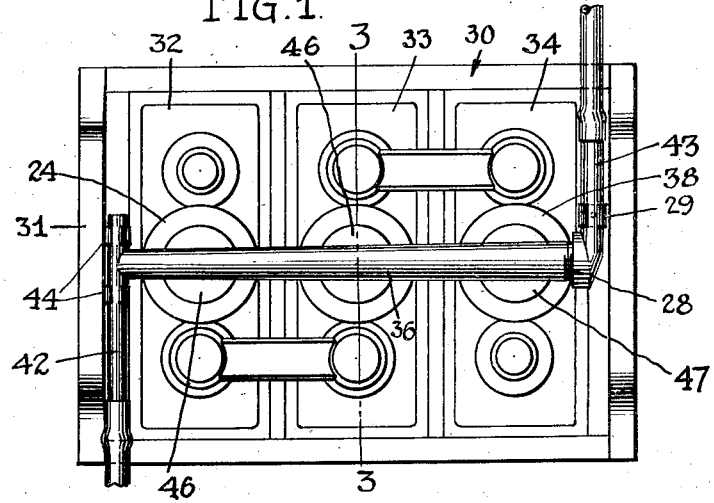
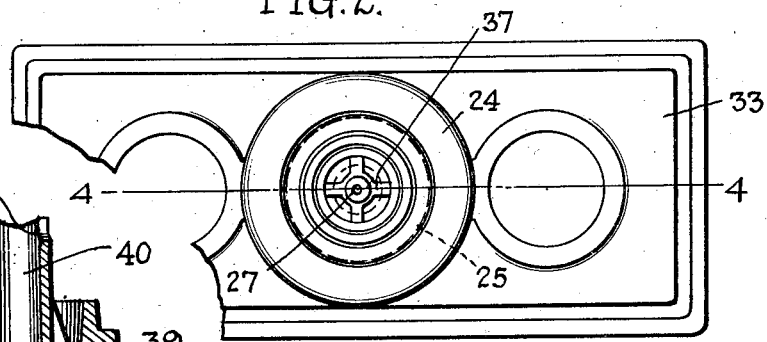
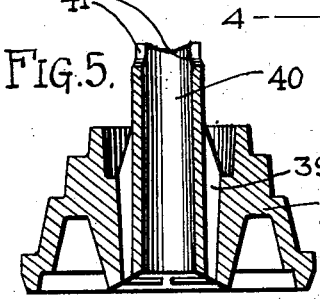
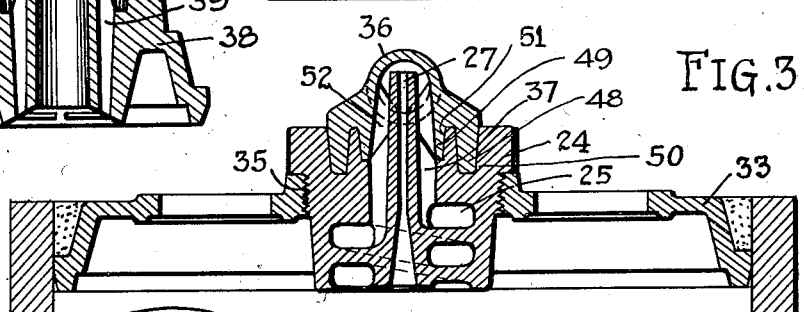
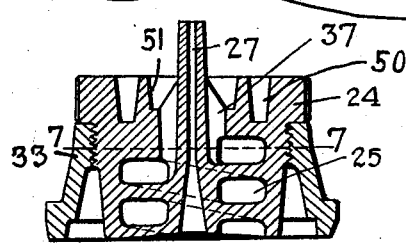
INVENTOR
SOLOMON L. VAN METER JR.
BY
ATTORNEY March 1, 1932.  S. L. VAN METER, JR  1,848,035
BATTERY REFILLING DEVICE
Original Filed March 6, 1926  2 Sheets-Sheet 2
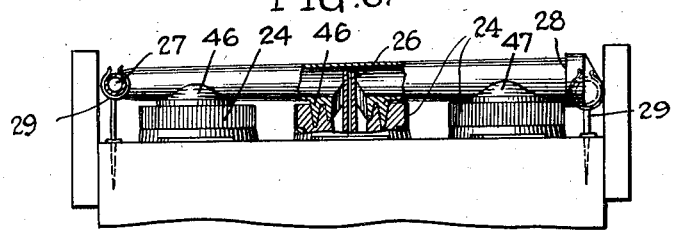
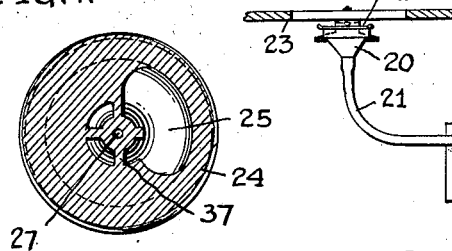
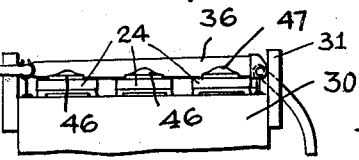
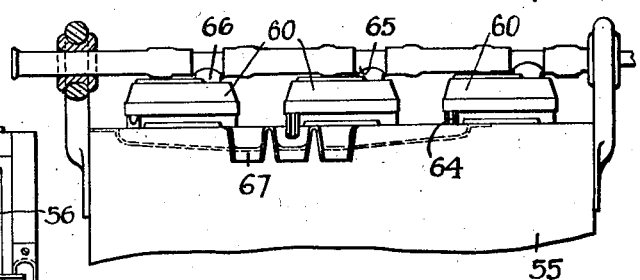
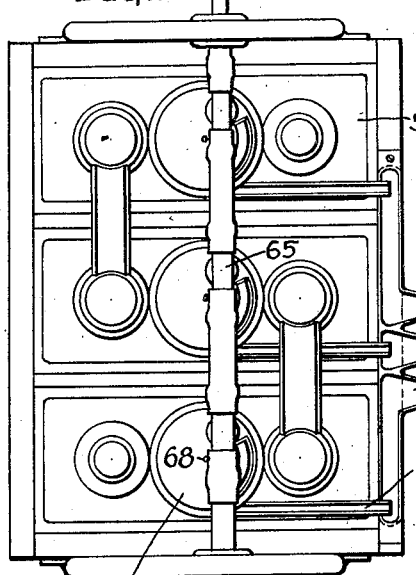
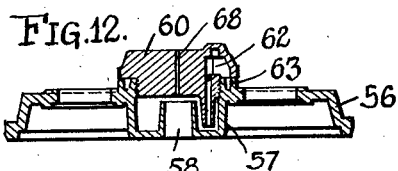
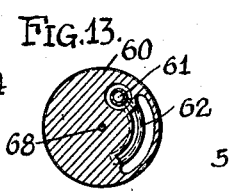
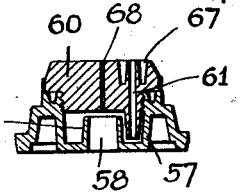
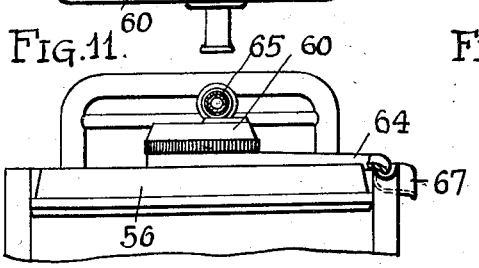
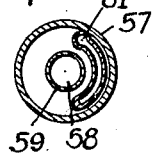
INVENTOR
SOLOMON L. VAN METER JR
BY
ATTORNEY Patented Mar. 1, 1932

1,848,035

UNITED STATES PATENT OFFICE

SOLOMON L. VAN METER, JR., OF WASHINGTON, DISTRICT OF COLUMBIA

BATTERY REFILLING DEVICE

Application filed March 6, 1926, Serial No. 92,741. Renewed July 18, 1929.

My invention relates to storage batteries for automobiles, aeroplanes, radio apparatus, etc., and is concerned more particularly with a refilling or servicing device especially adapted to the so-called "wet" batteries of either single or multiple cell construction.

In an application filed December 29, 1925, Serial Number 78,072, (since issued as U. S. Patent #1,791,152, granted February 3, 1931) I have set forth generally the objects and advantages of a refilling or servicing device such as that herein disclosed, the differences between such original conception and the present invention being essentially structural. Whereas in said earlier filed application I have disclosed a filler duct and an overflow duct for each battery cell, the present invention contemplates a single filler tube for the total number of cells, said single tube being extended at one end to serve also as an overflow tube likewise common to the total number of cells. Preferably such tube extends transversely across each battery cell and is so formed and constructed as to provide in effect a cap or closure for the several plugs which are in turn of novel construction. The plugs, or their equivalent, one for each cell, extend into the battery structure to discharge thereinto, and each cell is vented in such a way as to prevent the rise of the electrolyte therein beyond a predetermined level. By this means an overfilling of the battery cells when adding thereto distilled water is avoided.

Other objects and advantages of the invention will be hereinafter set forth.

In the drawings, wherein like reference characters denote like or corresponding parts, Fig. 1 is a plan view of a multiple cell storage battery equipped with the refilling device of my invention;

Fig. 2 is a plan view of a single battery cell with the filler tube and its associated parts removed;

Fig. 3 is an enlarged section on the line 3—3 of Fig. 1 with the cell connections removed;

Fig. 4 is a section on the line 4—4 of Fig. 2;

Fig. 5 is a similar view of the end cell enlargement;

Fig. 6 is a side elevation, partly in section, of the structure illustrated in Fig. 1;

Fig. 7 is a section on the line 7—7 of Fig. 4;

Fig. 8 is an assembly view showing the relation of the refilling device to a battery enclosing structure such as the body of an automobile;

Fig. 9 is a plan view of a multiple cell storage battery illustrating a modification;

Fig. 10 is a side elevation of the structure illustrated in Fig. 9;

Fig. 11 is an end view of said modification, and

Figs. 12, 13, 14 and 15 are detail sectional views further illustrating such modification.

While the invention is described and illustrated as applicable to a three cell storage battery, it is to be understood that in actual use its application is not thus limited. Obviously, with but slight modification, the invention may be used equally as well in connection with a single cell or with a battery comprising two or more than three cells.

The battery box illustrated in Fig. 1 is designated as 30, and it may or may not be provided with handles 31 at its opposite ends. Within said box three cells 32, 33 and 34 are contained. The cells 32 and 33 of the cell group may be provided each with a removable filler plug 24 or, if desired, the removable plugs may be dispensed with and a construction similar to that illustrated in Fig. 5 adopted. In any event, it is preferred that the end cell 34 be constructed as illustrated in said figure.

Where removable filler plugs 24 are used, the top wall of each cell has formed therein a threaded opening 35 within which a filler plug 24 is screwed. Said plug 24 (see Fig. 4) has formed centrally therein a vertical filler passage 25 open at its opposite ends respectively to the electrolyte chamber or cell and to a filler tube 36 which extends transversely across the top of the battery. Said filler passage 25, at its bottom end, is preferably spirally formed and is furthermore, at said bottom end, preferably tho not necessarily carried well into the cell chamber to substantially the desired level of the electrolyte. A vent tube 27, likewise open to the cell chamber and to the filler tube, is formed within said filler passage and, as shown, may be radially reinforced or stiffened, as indicated at 37. The lower end of this vent is so located within the cell as to be sealed by the electrolyte when it reaches a predetermined level.

Where removable plugs are dispensed with and the construction illustrated in Fig. 5 adopted for all of the battery cells, the need for an opening in the top cell wall disappears. Instead there is provided (see Fig. 5) an enlargement 38 integral with said top wall. The function of this enlargement is exactly the same as that of the plug or plugs 24. Like said plug or plugs 24, the enlargement 38 has formed centrally therein a filler passage 39 which tapers inwardly and which, at its opposite ends, is similarly open to the electrolyte chamber or cell and to the filler tube 36. Except for the fact that said filler passage 39 is straight throughout and the vent 40 of the enlargement 38 is larger than the vent 27 of the plug, the plug construction and the enlargement construction are the same. If desired, the vent wall, either in the enlargement 38 or the plug 24, may be carried sufficiently into the tube 36 to engage directly the inner top wall thereof, in which event, notches 41 are formed in said vent wall to open laterally into the filler tube.

The filler tube 36 as intimated, extends transversely across the top of the battery. Intermediately of its ends, said tube is open to the filler passages 25 and 39 as the case may be, the one tube 36 being common to all of the battery cells. At one end said tube 36 has fastened to it a lead-in or filler duct 42 and at its opposite end an overflow or outlet duct 43. The lead-in duct 42 is small in diameter and extends off from said filler tube at substantially a right angle. By fastening said duct to the battery box 30 as indicated at 44, such fastenings constitute a hinged connection for the filler tube. The overflow duct 43 (the size of which is immaterial) is threaded onto the filler tube as at 28 and sealed. Said overflow duct also extends off from said filler duct at substantially a right angle, being held by a spring clip 29 which, when released, admits of the filler tube being raised.

Upon reference to Fig. 6 it will be observed that the filler tube 36 from its inlet to its outlet end is of gradually enlarging diameter, and that intermediately of its ends, it is provided with enlargements or caps 46—46 and 47 adapted to engage respectively with the plugs 24—24 and the cell enlargement 38. Said enlargements 46—46 and 47 are of similar construction and each comprises in addition to its circular body portion, two downwardly projecting annular flanges 48 and 49 which are designed to snugly fit similarly formed recesses 50 and 51 formed either in the plugs 24—24 or the cell enlargement 38. This interlocking engagement between said tube enlargements and the cells seals the joint between the filler tube and each cell and at the same time establishes open communication therebetween. Right angle passages 52 formed, one in each tube enlargement, coincide with the filler passages of the cells. To assist in directing the waterflow thru the filler tube, its inside bottom wall is preferably V-shape as indicated.

As an aid in filling the several battery cells a feed-line 21 may be provided. This feed-line, as in said previous application, has its inlet end enlarged or funnel-shaped as indicated at 20, such funnel-shaped enlargement being disposed either directly beneath the floorboard 23 of the enclosing structure (an automobile for instance) or elsewhere as conditions warrant. Said feed-line is open at one end to the inlet duct 42 and may be provided at its funnel-shaped end with a spring closed lid or cover 22 (see Fig. 8).

In servicing the battery, distilled water is poured into the funnel-shaped mouth 20 of the feed-line 21. From said feed-line 21 the distilled water enters the inlet duct 42 which is in turn open to the smaller diameter end of the filler tube 36. The distilled water upon entering the filler tube, is conveyed by gravity first to the filler passage leading into the battery cell 32, the upstanding vent tube 27 projecting into said tube thru said passage, intercepting the water flow at this point. As the electrolyte in this first supplied battery cell 32 reaches the level indicated by the inner vent end, the vent is sealed, and the continued supply of distilled water automatically cut off. Being thus prevented from entering the battery cell 32, the distilled water backs up into the filler passage thereof until said passage is completely filled, whereupon its flow continues on thru said filler tube (which now functions as a combined filler and overflow tube) to the next succeeding filler passage and battery cell. When the end cell 34 of the battery has in this manner been filled, all water added in excess of the battery requirements is carried off thru the outlet duct 43 and discharged as waste. By extending the discharge end of said outlet duct to a point visible to the person servicing the battery, such overflow or waste, when apparent, gives a visible indication that no further filling is required.

In the modification of Figs. 9 to 15, inclusive, the distilled water, instead of being carried off thru an overflow passage common to the total number of battery cells, is carried off by means of separate passages, one for each cell. In said modification the battery box is designated as 55. Each cell 56 thereof, intermediately of its ends, has formed on its top enclosing wall a hollow chamber 57. This chamber 57 is carried into the cell to approximately the proper level of the electrolyte. Except for an opening 58 said bottom chamber end is closed, and around said opening an upstanding annular wall 59 is formed. Into the open upper end of the chamber 57 a plug 60 is threaded. As in the preferred form of the invention said plug 60 has formed therein a filler passage 61 extended at its bottom end into the chamber 57 to a point preferably below the upper end of the wall 59 surrounding the opening 58. This filler passage 61, in plan, is arcuately formed, and at or near its upper end opens laterally as at 62 to an annular passage 63, from which an outlet duct 64 leads.

As in the preferred form of the invention, a single filler tube 65 is provided for the total number of battery cells. This tube extends transversely across the several cells and is open, intermediately of its ends, to each filler passage 61, the joint between said tube and said filler passage being formed by enlargements 66 formed on the filler tube and fitting recesses 67 formed, one in each plug 60, around its filler passage. Preferably, the filler tube 65 is divided transversely, a separate tube section being provided for each plug 60.

In servicing a battery equipped with this modified form of servicing device, the distilled water is led first into the filler tube 65. From said tube the distilled water enters successively the filler passages 61. At the bottom end of each filler passage the water first enters the chamber formed by the enlargements 57 of the battery cell and as such chamber fills the water spills over the wall 59 of the opening 58 to enter finally the electrolyte chamber. As each cell is filled to its proper level, the distilled water backs up thru the filler passage 61 to the lateral opening 62 thereof where it is carried off from each cell individually by means of the outlet duct 64. As indicated in Fig. 10, the battery box 55 may be provided at one side of the cells 56 thereof with a gutter 67 properly sloped to carry off the overflow. Moreover, each plug 60 has formed therein a suitable vent 68, the action of which is the same as in the embodiment of the invention first described.

From the above, taken in connection with the accompanying drawings, it will be observed that in the preferred form of the invention each vent opening, when the battery is completely filled, is sealed by the electrolyte, thereby shutting off the discharge of liquid from the filler passage into the cell and causing the filling liquid to back up in said filler passage and to run off either into the next adjacent cell or thru the overflow duct as the case may be. Such sealing of the vent, however, will not interfere with the proper escape of the accumulating gas in the battery cells as the motion of the vehicle (if the battery is thus used) will cause any water accumulating in said vent to enter the battery cell and at the same time occasionally open the vent at its lower end. Furthermore, if desired, each vent, as illustrated in Fig. 5 may be made large enough to accommodate a hydrometer.

While I have described my invention in detail in its present preferred embodiment it will be obvious to those skilled in the art after understanding my invention, that various changes and modifications may be made therein without departing from the spirit or, scope thereof. I aim in the appended claims to cover all such modifications and changes.

What I claim is:

1. The combination with a storage battery cell, of a filler passage discharging into said cell, an overflow duct communicating with said filler passage, and a vent to the outer air for said cell extending up thru said filler passage to a point above the level of the inlet end of said overflow duct said vent being so located within said cell as to be sealed by the electrolyte when it reaches a predetermined level, thereby shutting off the discharge of liquid from said filler passage into said cell and causing it (the liquid) to back up in said filler passage and to run off thru said overflow duct.

2. The combination with a storage battery cell, of a filler passage discharging into said cell, an inlet duct communicating with said filler passage, an overflow duct also in communication with said filler passage and a vent to the outer air for said cell extending up thru said filler passage to a point above the outlet end of said inlet duct, said vent being so located within said cell as to be sealed by the electrolyte when it reaches a predetermined level, thereby shutting off the discharge of liquid from said filler passage into said cell and causing it (the liquid) to back up in said filler passage and to run off thru said overflow duct.

3. The combination with a storage battery cell, of a filler passage discharging into said cell, an overflow duct communicating with said filler passage, and a vent tube for said cell extending up thru said filler passage and open at its outer end to the outer air, said tube having a smaller exterior diameter than the inside diameter of the surrounding wall of said filler passage, and said vent being so located within said cell as to be sealed by the electrolyte when it reaches a predetermined level, thereby shutting off the discharge of liquid from said filler passage into said cell and causing it (the liquid) to back up in said filler passage and to run off thru said overflow duct.

4. The combination with a storage battery cell, of a filler passage discharging at its lower end into said cell, an overflow duct communicating with said filler passage at a point in the vicinity of the upper end thereof, and a vent tube for said cell extending up thru said filler passage from a point at least as low as the discharge end of said filler passage to a point above the point of communication between said filler passage and said overflow duct, said vent tube being open at its outer end to the outer air and being so related to said cell as to admit of the sealing of the lower end of the vent by the electrolyte when it reaches a predetermined level, thereby shutting off the discharge of liquid from said filler passage into said cell and causing it (the liquid) to back up in said filler passage and to run off thru said overflow duct.

5. The combination with a storage battery cell, of a filler passage discharging at its lower end into said cell, an inlet duct communicating with said filler passage at a point in the vicinity of the upper end thereof, an overflow duct also in communication with said filler passage, and a vent tube for said cell extending up thru said filler passage from a point at least as low as the discharge end of said filler passage to a point above the point of communication between said filler passage and said inlet duct, said vent tube being open at its outer end to the outer air and being so related to said cell as to admit of the sealing of the lower end of the vent by the electrolyte when it reaches a predetermined level, thereby shutting off the discharge of liquid from said filler passage into said cell and causing it (the liquid) to back up in said filler passage and to run off thru said overflow duct.

6. The combination with a storage battery cell, of a filler duct including a filler passage discharging at one end into said cell, a filler duct open to said filler passage at a point remote from the discharge end thereof, an overflow duct open to said filler passage at a point substantially diametrically opposite to the point of communication between said inlet duct and said filler passage, and means at the juncture of said filler passage with said filler duct adapted to intercept and direct the flow of liquid toward the discharge end of said filler passage as it enters said filler passage from said filler duct.

7. The combination with a storage battery cell, of a filler passage discharging at one end into said cell, a filler duct open to said filler passage at a point in the vicinity of its opposite end, an overflow duct likewise open to said filler passage at a point in the vicinity of said last mentioned end, said filler passage being unobstructed from its inlet to its discharge end whereby, in a filling operation, the filling liquid upon the electrolyte reaching a predetermined level, is adapted to back up within said filler passage until the level of said overflow duct is reached, at which point, and by means of said overflow duct, the excess filling liquid is carried off, and means within said filler passage at the juncture of the filler duct therewith for intercepting and directing the filling liquid toward the discharge end of said filler passage during a filling operation.

8. The combination with a storage battery cell, of a filler passage discharging at one end into said cell, a filler duct open to said filler passage at a point in the vicinity of its opposite end, an overflow duct likewise open to said filler passage at a point in the vicinity of said last mentioned end, said filler passage being unobstructed from its inlet to its discharge end whereby, in a filling operation, the filling liquid upon the electrolyte reaching a predetermined level, is adapted to back up within said filler passage until the level of said overflow duct is reached, at which point, and by means of said overflow duct, the excess filling liquid is carried off, and means in the vicinity of the outlet end of said filler duct within said filler passage for intercepting and directing the filling liquid toward the discharge end of the filler passage during a filling operation.

9. The combination with a storage battery cell, of a filler passage discharging at one end into said cell, a filler duct open to said filler passage at a point in the vicinity of its opposite end, an overflow duct likewise open to said filler passage at a point in the vicinity of said last mentioned end, said filler passage being unobstructed from its inlet to its discharge end whereby, in a filling operation, the filling liquid upon the electrolyte reaching a predetermined level, is adapted to back up within said filler passage until the level of said overflow duct is reached, at which point, and by means of said overflow duct the excess filling liquid is carried off, and means extending up thru said filler passage to a point at least as high as the outlet end of the inlet duct to intercept and direct the filling liquid toward the discharge end of said filler passage during a filling operation.

10. The combination with a storage battery cell, of a filler passage discharging at one end into said cell, a filler duct open to said filler passage at a point in the vicinity of its opposite end, an overflow duct likewise open to said filler passage at a point in the vicinity of said last mentioned end, said filler passage being unobstructed from its inlet to its discharge end whereby, in a filling operation, the filling liquid upon the electrolyte reaching a predetermined level, is adapted to back up within said filler passage until the level of said overflow duct is reached, at which point, and by means of said overflow duct the excess filling liquid is carried off, and means interposed between the outlet end of the filler duct and the inlet end of the overflow duct within said filler passage for intercepting and directing the filling liquid toward the discharge end of said filler passage during a filling operation.

11. In a service system for multiple cell storage batteries, a plurality of filler passages, one for each cell, each said filler passage terminating at one end within its associated cell and being unobstructed from its inlet to its outlet end, a filler duct by means of which filling liquid is supplied to one said filler passage, combined filler and overflow ducts extending between adjacent filler passages and by means of which the filling liquid is successively conveyed to the remaining number of battery cells, the filling liquid, in a filling operation, upon the electrolyte reaching a predetermined level in the cell first supplied with filling liquid being adapted to back up within the filler passage thereof until the level of the combined filler and overflow duct extending off therefrom is reached, whereupon the unused filling liquid is conveyed in the same way to the remaining cells which are similarly filled in succession, an overflow duct extending off from the filler passage last supplied with filling liquid, said overflow duct being open to the outer air whereby the excess of liquid supplied to the battery is carried off, and a vent for each cell open to the outer air by way of said overflow duct.

12. In a storage battery filling system, the combination with a battery cell adapted to contain an electrolytic compound, of a passage for a filling liquid discharging into said cell, an overflow duct communicating with said filler passage, and a vent for said cell admitting of the escape of the air and gas contained therein to the outside atmosphere, said vent being extended up thru said filler passage and being so located within said cell as to admit of the lower end of the vent being sealed by the electrolyte when it reaches a predetermined level, thereby shutting off the discharge of liquid from said filler passage into said cell and causing it (the liquid) to back up in said filler passage and to run off thru said overflow duct.

13. In a storage battery filling system, the combination with a battery cell adapted to contain an electrolytic compound, of a passage for a filling liquid discharging into said cell, an overflow duct communicating with said filler passage, and a vent for said cell admitting of the escape of the air and gas contained therein to the outside atmosphere by way of said overflow duct, said vent being extended up thru said filler passage and being so located within said cell as to admit of the lower end of the vent being sealed by the electrolyte when it reaches a predetermined level, thereby shutting off the discharge of liquid from said filler passage into said cell and causing it (the liquid) to back up in said filler passage and to run off thru said overflow duct.

14. In a storage battery filling system, the combination with a battery cell adapted to contain an electrolytic compound, of a passage for a filling liquid discharging into said cell, an overflow duct communicating with said filler passage, and a vent for said cell admitting of the escape of the air and gas contained therein to the outside atmosphere, said vent being formed by extending a relatively small diameter tube up thru said filler passage and being so located within said cell as to admit of the lower end of the vent being sealed by the electrolyte when it reaches a predetermined level.

In testimony whereof I hereunto affix my signature.

SOLOMON L. VAN METER, Jr.